United States Patent
Forrester et al.

(10) Patent No.: US 9,152,637 B1
(45) Date of Patent: Oct. 6, 2015

(54) JUST-IN TIME FORMATTING OF FILE SYSTEM METADATA

(75) Inventors: Walter C. Forrester, Berkeley Heights, NJ (US); Marc DeSouter, Wayne, NJ (US); Michael D. Scheer, Summit, NJ (US); Morgan Clark, South Orange, NJ (US); Pranit Sethi, Somerset, NJ (US)

(73) Assignee: EMC Corporation, Hopkinton, MA (US)

( * ) Notice: Subject to any disclaimer, the term of this patent is extended or adjusted under 35 U.S.C. 154(b) by 550 days.

(21) Appl. No.: 13/591,612

(22) Filed: Aug. 22, 2012

(51) Int. Cl.
G06F 17/00 (2006.01)
G06F 17/30 (2006.01)

(52) U.S. Cl.
CPC .... G06F 17/30067 (2013.01); G06F 17/30091 (2013.01)

(58) Field of Classification Search
CPC ............... G06F 17/30067; G06F 17/30091; G06F 17/301; G06F 17/30371
USPC ................... 707/687, 690, 692; 711/217, 218
See application file for complete search history.

(56) References Cited

U.S. PATENT DOCUMENTS

| | | | |
|---|---|---|---|
| 7,539,824 B2 | 5/2009 | Lolayekar et al. | |
| 2006/0075191 A1 | 4/2006 | Lolayekar et al. | |
| 2007/0157002 A1 | 7/2007 | Zelikov et al. | |
| 2011/0078118 A1 | 3/2011 | Kushwah | |
| 2011/0302224 A1* | 12/2011 | Yairi et al. | 707/824 |
| 2012/0159071 A1* | 6/2012 | Kamon et al. | 711/118 |

* cited by examiner

*Primary Examiner* — Hares Jami
(74) *Attorney, Agent, or Firm* — BainwoodHuang (57) ABSTRACT

An improved technique generates formatted file system metadata in increments only when metadata for those increments are specifically requested. A location on a storage volume designated for storing file system metadata is read and tested to determine whether it stores a predetermined pattern indicating an unformatted state. If the pattern is found, metadata for the designated location are generated and returned. Otherwise, metadata are returned as initially read from the storage volume.

17 Claims, 4 Drawing Sheets

JUST-IN TIME FORMATTING OF FILE SYSTEM METADATA

BACKGROUND

Data storage systems, such as disk drives and storage arrays (i.e., arrays of disk drives and/or other non-volatile storage devices) generally require formatting to provide a full range of capabilities. Formatting typically involves writing file system metadata to storage media. The metadata includes file system bookkeeping information, such as ownership information pertaining to different blocks, or groups of blocks, of the storage media, as well as free space on the storage media.

Certain storage arrays have the ability to provision storage on the fly. Such arrays may serve the needs of multiple users running various applications. When data storage requirements from users exceed the amount of storage currently available to the array, the array can reach into a reserve of storage media and provision additional storage, bringing the additional storage online in response to the user demand.

In many arrays, metadata consumes a substantial amount of storage space. When new media of an array are provisioned, the contents of the media are formatted, with file system metadata being written to the media. It has been estimated that file system metadata consumes between 1 and 10% of the total amount of space of a formatted medium.

SUMMARY

Storage arrays are typically designed to handle large numbers of requests from users to read and/or write data to storage media of the arrays. A properly functioning array can respond quickly to such requests, to avoid delays and promote a favorable user experience.

Unfortunately, however, the process of formatting file system metadata for newly provisioned storage of an array can consume valuable array resources and can temporarily impair the ability of the array to respond quickly and efficiently to read and write requests, which continue to arrive undiminished from user applications during the time formatting takes place.

One approach for reducing the processing burden on an array when formatting newly added media has been to provision and format the media in "slices." For example, rather than bringing an entire storage volume (e.g., disk drive) on line all at once, a slice from the storage volume of approximately 1 GB in size is provisioned, formatted, and added to the file system. A significant reduction in overhead is thus realized, as compared with provisioning and formatting an entire storage volume all at once.

It has been recognized, however, that provisioning and formatting newly added slices, a slice at a time, works well for certain types of volumes, or "LUNs" (logical storage units) but does not work well for other types of LUNs. For example, some LUNs tend to store data compactly, whereas others tend to store data in a more dispersed manner, such that growth of the file system by even small amounts requires many new slices to be brought online. As a result, formatting file system metadata a slice at a time can still be highly burdensome.

In contrast with prior approaches, which can impair array performance by formatting large amounts of file system metadata all at once while the array is concurrently processing requests from users, an improved technique formats file system metadata in smaller increments only when the file system specifically requests access to those increments of metadata. When the file system or other requestor requests access to a location on a media designated for an increment of metadata, such as to check the ownership of blocks associated with that location, the location is read and inspected. If inspection reveals the absence of formatted metadata, new formatted metadata for the designated location are generated and returned to the requestor. However, if inspection reveals that formatted metadata are already present at the designated storage location, the metadata is simply returned to the requestor as read. In this fashion, file system metadata are formatted in increments, when the file system actually attempts to access the metadata. Bulk formatting of metadata, either a volume at a time or a slice at a time, is therefore avoided, as are the associated reductions in array performance.

Certain embodiments are directed to a method of formatting file system metadata. The method includes receiving, from a requestor, a request to read file system metadata from a designated location of a storage volume and reading the designated location of the storage volume. The method further includes testing whether data read from the designated location of the storage volume matches a predetermined pattern indicating an unformatted state and generating formatted metadata for the designated location of the storage volume when the data read from the designated location matches the predetermined pattern.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for formatting file system metadata generates formatted metadata in increments only when the increments of metadata are specifically requested. The technique includes reading a location on a storage volume designated for storing file system metadata and testing the data read to determine whether they store a predetermined pattern indicating an unformatted state. If the pattern is found, metadata for the designated location are generated and returned. Otherwise, metadata are returned as initially read from the storage volume.

Figure 1:
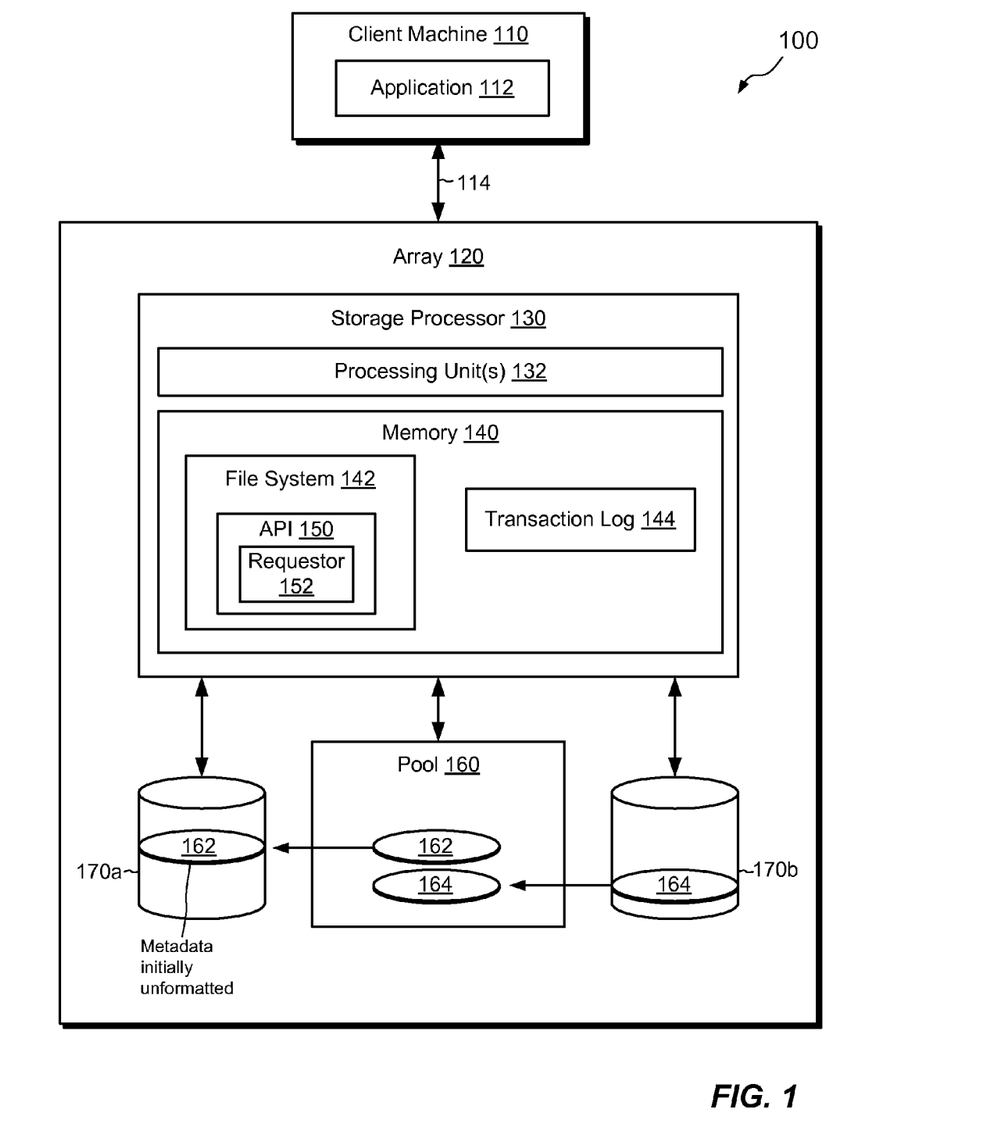
FIG. 1 is a block diagram of an example electronic environment including a client machine and a storage array in which illustrative embodiments of the invention are practiced.

FIG. 1 shows an example, generalized electronic system 100 in which improved techniques for formatting file system metadata can be carried out. The electronic system 100 includes a client machine 110 connected to a storage array 120 over a medium 114, such as the Internet, another type of computer network, or a direct connection, for example. The client machine 110 runs a user application 112, which reads data from the array 120 and writes data to the array 120. In some examples, multiple client machines are provided and connected to the array 120. For example, the array 120 may be provided as a file server in connection with a website or other online resource serving a large number of client machines 110.

The array 120 includes a storage processor 130, a pool 160 of storage resources, and various storage volumes (LUNs) 170a and 170b. Each LUN (logical storage unit) includes multiple slices. Although only two LUNs 170a and 170b are shown, it is understood that the array 120 may contain any number of LUNs.

The storage processor 130 includes a set of processing units 132, e.g., one or more processing chips and/or assemblies, and memory 140. The memory 140 includes both volatile and non-volatile memory and stores instructions for realizing a file system 142 and a transaction log 144. The file system 142 organizes files and metadata stored in the LUNs 170a-b. In an example, the file system 142 includes a mapping of files and file system metadata to particular storage locations on the LUNs 170a-b. The mapping may be explicit (e.g., stored in a mapping table), algorithmic (e.g., computed), or may employ a combination of explicit and algorithmic mappings or other mapping techniques. In some examples, the file system 142 includes an API 150 (application programming interface), which exposes various methods. The methods include a requestor method 152 for requesting file system metadata. The API 150 may include other methods, as well. Although only one storage processor 130 is shown, it is understood that the array 120 may include multiple storage processors, as appropriate for the particular implementation.

Instructions from the application 112 cannot always be completed without provisioning additional storage. In an example, when additional storage is needed, the storage processor 130 directs the pool 160 to provision a slice of storage (e.g., one or more portions of one or more physical disk drives held in reserve by the pool 160) to a LUN. For example, a slice 162 may be provisioned from the pool 160 to the LUN 170a. Also, there are times when slices that have already been provisioned are no longer required. Such slices may be returned to the pool 160. For example, slice 164 of the LUN 170b may be returned to the pool 160 when it is no longer needed.

According to techniques described herein, provisioning slices from the pool 160 to any of the LUNs 170a-b does not involve formatting file system metadata, i.e., slices are provisioned without file system metadata being generated or written. Accordingly, the process for provisioning storage on the array 120 involves much less overhead than prior approaches, which format metadata on provisioned storage as part of the provisioning process. With certain embodiments of the instant technique, however, it is desired that the data stored at metadata locations on provisioned storage matches a predetermined pattern. For example, the locations designated for metadata on provisioned storage can be caused to be blank (all zeroes) or made to match some other recognizable pattern (all ones, alternating ones and zeroes, etc.). Data processing to ensure that provisioned storage contains the predetermined pattern in metadata locations can be done at any suitable time and need not compete with instructions from the client machine 110 for resources of the array 120.

In operation, the application 112 running on the client machine 110 issues instructions for reading from and writing to particular files (or portions thereof) on the array 120. The storage processor 130 receives the instructions and takes actions to carry out the requested instructions.

It is sometimes necessary for the file system 142 to check and/or update file system metadata in connection with reading or writing a file, or a portion thereof, in response to an instruction from the client machine 110. For example, it may be necessary to update ownership of a file. In an example, however, the file system 142 has no independent record of which locations on the LUNs 170a-b contain formatted metadata and which do not.

To access metadata for a particular file or portion of a file, the file system 142 executes a mapping operation (e.g., an algorithmic operation and/or look-up operation) to obtain the location of the metadata for the file or portion thereof on the array 120. The location is designated, for example, with a particular LUN identifier, a particular slice identifier, and a particular block offset relative to the slice. A digital value is then read from the designated location on the array 120. In some examples, as indicated, the file system 142 cannot determine in advance whether the designated location includes formatted metadata or not. The digital value read from the designated location is thus tested to determine whether it matches the predetermined pattern that indicates unformatted metadata (e.g., all zeroes). In an example, if the digital value matches the predetermined pattern, the file system 142 proceeds to generate formatted metadata for the designated location. If the digital value does not match the predetermined pattern, the file system 142 concludes that the digital value read from the designated location is already formatted metadata and does not generate new formatted metadata.

Figure 2:
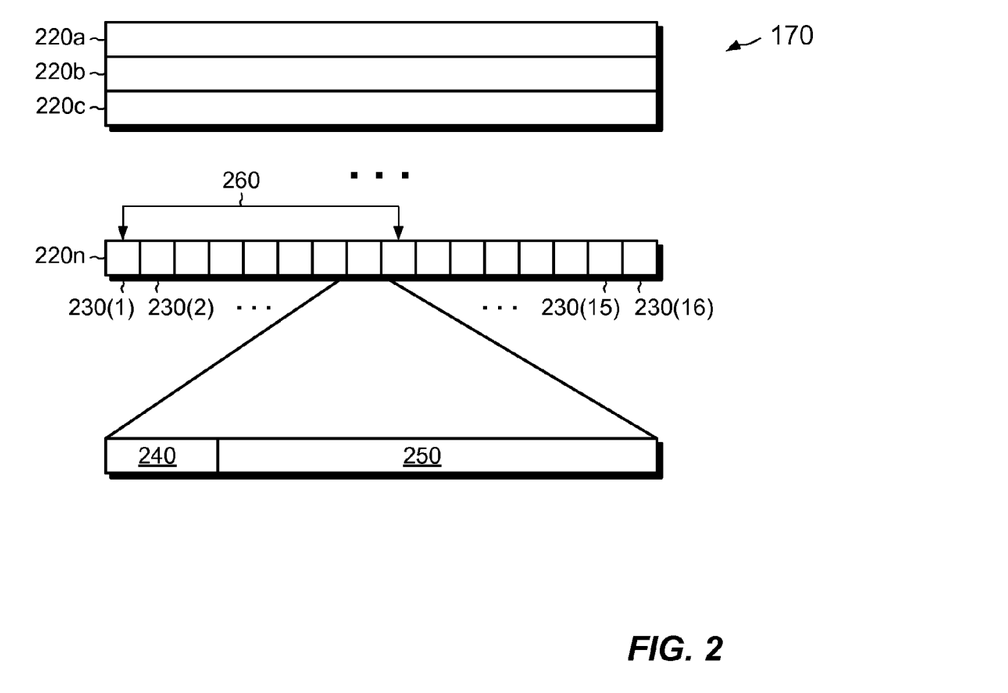
FIG. 2 is a diagram of an example volume of the storage array of FIG. 1.

FIG. 2 shows an example structure of a storage volume (LUN) 170 in additional detail. The LUN 170 may be any of the LUNs 170a-b and is representative of such LUNs. As shown, the LUN 170 includes multiple slices 220a-220n. The slice 220n shows, by way of example, the structure of each slice. It is understood that all slices 220a-n may have the same or a similar structure to that shown in the slice 220n.

The slice 220n is seen to include a number of groups 230(1)-230(16). Sixteen groups are shown; however, it is understood that this number may be varied and in some arrays can be changed explicitly as a parameter. In an example, each group is a "cylinder group," as employed in Unix file systems as well as other file systems. Each of the groups 230(1-16) includes a designated region 240 for storing metadata and a designated region 250 for storing user data.

It is understood that the slices 220a-n and the groups 230 (1-16) are logical structures recognized by the file system 142. Although the slices 220a-n and groups 230(1-16) are made up of physical storage media, any of the slices 220a-n can be formed from one or more physical media, such as disk drives. Similarly, any of the groups 230(1-16) can be formed from one or more physical media.

In an example, when the file system 142 requests access to metadata, the file system 142 specifies the location 240 of a particular group of a particular slice on a particular LUN. The file system then reads the contents of the designated location 240.

In an example, groups on any given slice are provided in pairs. For instance, a group 230(1) is paired with a group 230(9) to form a pair 260. As is known, corruption arising from software and/or hardware errors can cause data to be erroneously written to a LUN. If corruption causes the predetermined pattern to be written to a region 240, that region 240 can be mischaracterized as including unformatted data when in fact it does not. To guard against this possibility, the groups 230(1-16) are updated in pairs, such that both groups of a pair contain formatted metadata or both groups do not. Corruption can then be ruled out by checking that the assigned counterpart for any group (i.e., the other group of the pair) also contains the predetermined pattern. Conversely, if the region 240 of a group shows the predetermined pattern and the region 240 of its counterpart does not, then it can be assumed that corruption has occurred.

In certain examples, each of the groups 230(1-16) is paired with another group on the same slice. Pairs are preferably separated from one another, to ensure that whatever corruption affects the region 240 of one group of the pair is not likely to affect the region 240 of the other. In an example, pairs are separated from each other by a distance approximately equal to half the size of a slice. Thus, where a slice is 1 GB, pairs or groups, such as the pair 260, are separated from each other by approximately 500 MB.

To allow corruption to be checked in the manner described, the file system 142 maintains synchronization between the groups of each pair. Thus, whenever formatted metadata is written to one group of a pair, formatted metadata is also written to the other group of the pair. Similarly, in some examples, whenever metadata is erased and replaced with the predetermined pattern in one group of a pair, metadata is also erased and replaced with the predetermined pattern in the other group of the pair. There is no requirement, however, that the same file system metadata be written to both groups of a pair. Rather, file system metadata for each group of a pair may be particular to the group.

Figure 3:
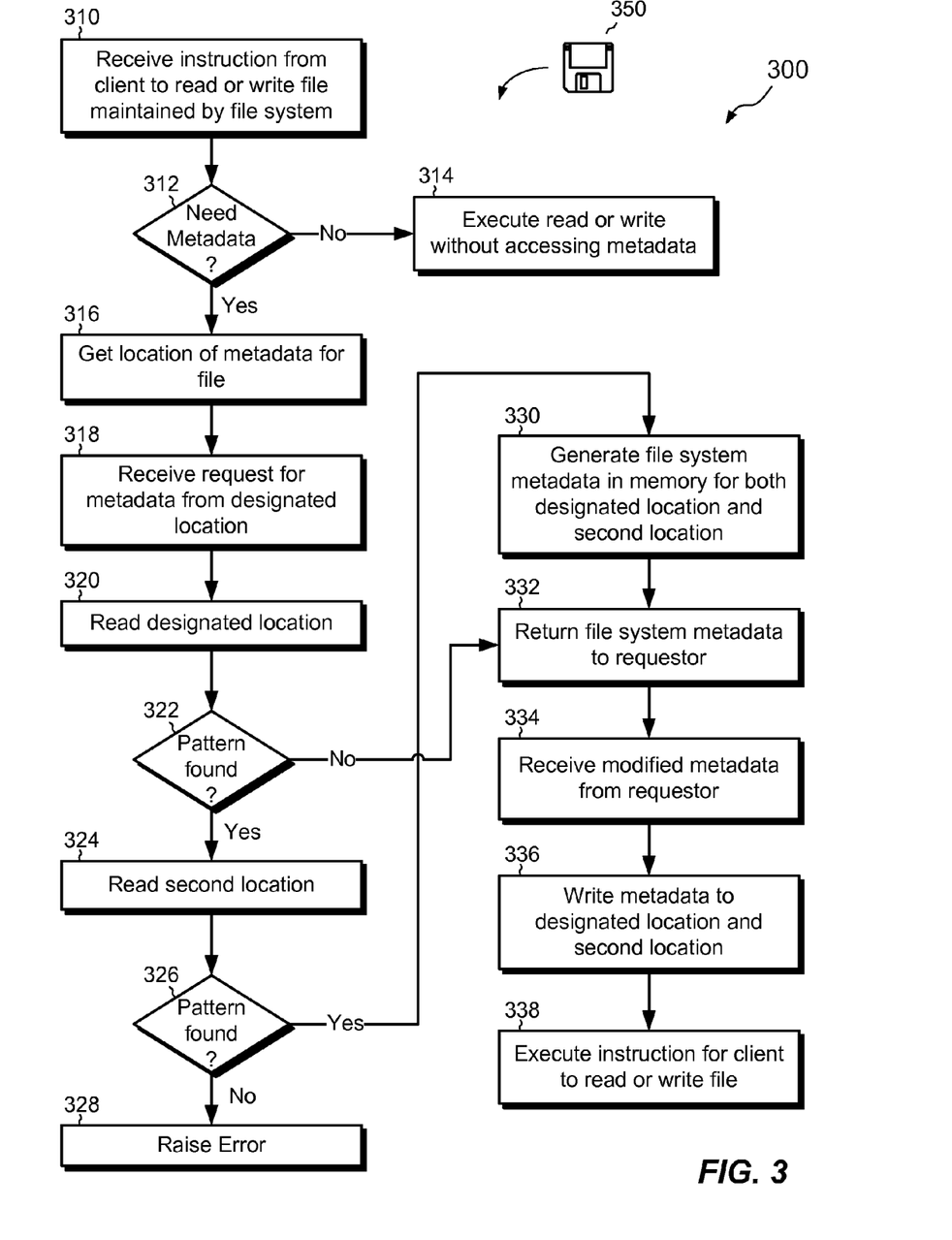
FIG. 3 is a flow chart showing an example process for formatting metadata in the example environment of FIG. 1 using the example volume of FIG. 2.
Figure 4:
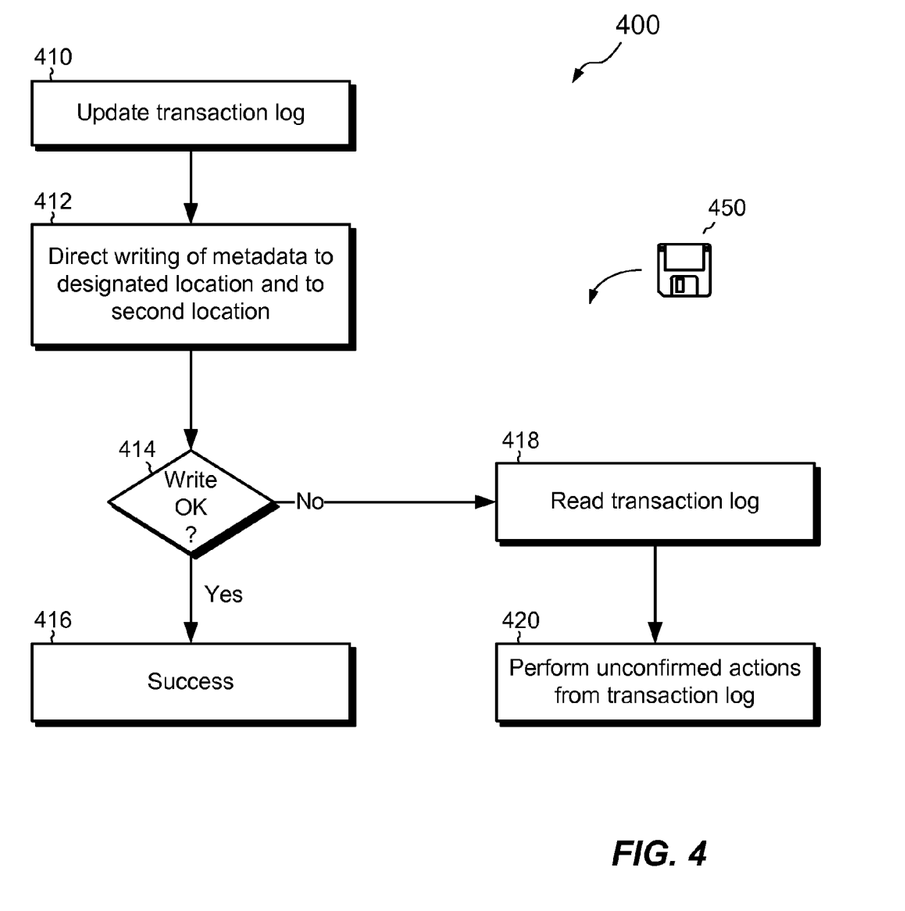
FIG. 4 is a flowchart showing a process for logging events and recovering from errors, such as system crashes, which may occur during execution of the process of FIG. 3.

FIGS. 3 and 4 show example processes 300 and 400 for formatting file system metadata. The processes 300 and 400 are typically performed by the software constructs, described in connection with FIGS. 1 and 2, which reside in the memory 140 of the array 120 and are run by the set of processing units 132. The various acts of the processes 300 and 400 may be ordered in any suitable way. Accordingly, embodiments may be constructed in which acts are performed in orders different from those illustrated, which may include performing some acts simultaneously, even though the acts are shown as sequential in the illustrated embodiments.

Beginning with FIG. 3, an instruction is received at step 310 from the client machine 110. The instruction may include a direction to read a file or a portion of a file from a particular LUN of the array 120, or to write a file or a portion of a file to a particular LUN of the array 120, for example.

At step 312, the file system 142 checks whether the requested action requires access to file system metadata. If not, control proceeds to step 314, whereupon the array 120 executes the read or write instruction without accessing file system metadata.

If, however, it is determined at step 312 that file system metadata is required, control proceeds to step 316, where the array 120 obtains a location of file system metadata for the file or portion thereof. For example, the file system 142 may perform a lookup and/or algorithmic mapping operation, to obtain the specific location on the array 120 of the requested metadata. The location may be described in any suitable manner, such as by LUN identifier, slice identifier, and offset within a slice, for example.

At step 318, a request is received for the metadata from the identified location. In one example, the request is received from the requestor method 152 of the API 150. Alternatively, the request is received from some other requestor.

At step 320, the designated location on the identified storage volume is read. The contents of the data read are then checked for the presence of the predetermined pattern that indicates unformatted file system metadata (step 322). In an example, the predetermined pattern is a pattern of all zeroes.

If, at step 322, the predetermined pattern is found at the designated location, control proceeds to step 324, where a second location is read. In an example, the designated location is the region 240 of one of the groups 230(1-15) of a particular one of the slices 220a-n, and the second location is the region 240 of its counterpart on the same slice.

At step 326, the region 240 of the second location is itself checked for the predetermined pattern. If the pattern is not found, an error is raised (step 328), indicating that the data at either the designated location or the second location has been corrupted.

If, however, at step 326, the second location is found to include the predetermined pattern, control proceeds to step 330. Here, file system metadata are generated in memory 140. To maintain pairing between the designated location and the second location, file system metadata are also generated for the second location. Preferably, the file system metadata for both the designated location and the second location are not written to the array 120 at this time, but rather exist as constructs in the memory 140.

At step 332, the generated file system metadata are returned to the requestor. Although the requestor may be attempting only to read file system metadata, a more typical situation involves a read-modify-write operation in which the generated metadata are updated with the intent of writing the updated metadata back to the designated location.

At step 334, modified metadata are received from the requestor. The received metadata includes modified metadata for the first location, as well as metadata for the second location.

At step 336, the metadata received at step 334 are written to the array 120. The modified metadata for the designated location are written to the designated location, and the metadata for the second location are written to the second location.

With the need for accessing file system metadata satisfied, the instruction from the client machine 110 for reading or writing to the array 120 can be executed (step 338).

Returning to step 322, if the data read from the designated location do not reveal the predetermined pattern, it can be assumed that formatted file system metadata is already present at the designated location, and control proceeds to step 332, where the file system metadata is returned to the requestor. Then, as already described (as in the case of read-modify-write), updated metadata is received from the requestor (step 334), the metadata is written to the LUN (step 336), and the instruction from the client machine 110 (i.e., read or write) is executed (step 338).

It can be seen that the process 300 writes file system metadata to the array 120 only when such writing is specifically requested. It is therefore evident that metadata are not written to the array 120 unless a specific instruction to do so is received. For example, metadata are not written to the array 120 if the requestor merely reads the metadata. Rather, the metadata are computed in the memory 140, provided to the requestor, and discarded after they are used.

FIG. 4 shows an example process 400 for writing metadata to the array 120 in greater detail. For example, the process 400 is a more detailed explication of step 336 of FIG. 3.

At step 410, the transaction log 144 is updated. The update includes writing an entry into the transaction log 144 describing actions that the file system 142 will perform in writing the updated metadata, i.e., actions that have not yet taken place at the time the entry is written. In an example, the entry to the transaction log 144 describes each value of metadata to be written and the locations at which the respective metadata are to be written.

At step 412, the file system 142 directs the updated file system metadata to be written to the array 120, for both the designated location and the second location. Under normal circumstances, the updated metadata are queued and written to the array 120 without errors. Sometimes, however, errors can occur, such as system hardware or software failures that cause the system to reboot, causing the actions of writing the updated file system metadata to fail.

At step 414, a determination is made as to whether the updated metadata was written successfully. In an example, metadata is written successfully only when writing is successful both at the designated location and at the second location. A successful writing of metadata is indicated at step 416. If the metadata was not written successfully, however, control proceeds to step 418, whereupon the transaction log 144 is read. Any intended actions written to the transaction log 144 which have not yet been conducted are then performed, such that the original intention expressed in the transaction log 144 to write the updated metadata is carried out.

In the manner described, writing updated metadata to the LUN is an atomic operation. Once the transaction log 144 is updated with the intended actions, the actions are as good as done. If an error occurs that prevents the completion of the actions, the transaction log 144 is read and the intended actions are accessed and performed. Conversely, if the transaction log 144 is not updated with the intended actions, the actions are never performed. Because the transaction log 144 stores actions for both writing to the designated location and writing to the second location, the process 400 helps to ensure that metadata for the designated location and the second location remain synchronized.

An improved technique has been described for formatting file system metadata in increments, only when the file system 142 specifically requests access to those increments of metadata. Bulk formatting of metadata, either a disk drive at a time or a slice at a time, is therefore avoided, as are the associated reductions in array performance.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, it has been described that requests for file system metadata arise as a result of instructions from the application 112 on the client machine 110 to read or write files or portions of files. This is merely an example, however. Requests for file system metadata can arise in other contexts, such as when the array 120 performs self-checks or housekeeping tasks.

In addition, requests for file system metadata have been described as originating from the requestor method 152. This is also merely an example. Alternatively, the requestor of metadata can be some other part of the file system 142 or some other part of the array 120. In yet other examples, the requestor of file system metadata may reside outside the array 120.

Also, requests for file system metadata need not be associated with access to files, per se. Alternatively, requests for file system metadata can arise when it is desired to examine particular blocks or other portions of a storage volume, regardless of their association with any particular file.

Also, it has been shown and described that storage volumes (i.e., LUNs) include multiple slices, where each slice includes multiple groups, such as cylinder groups. However, this also is merely an example, as the techniques hereof are not limited to any particular structure for storing data.

Also, although improvements have been described herein with reference to the generalized storage array of FIG. 2, it is understood that the improvements hereof are not limited to any particular type of array. Rather, storage arrays vary widely in their architecture, and the techniques described herein apply to any type of array, regardless of its architecture.

In addition, the file system 142 is shown and described as being part of the storage processor 130. Alternatively, the file system 142 may reside in its own processing system, such as on a file system server, with multiple storage processors communicating with the file system server to gain access to the various storage volumes on the array.

Further still, the improvement or portions thereof may be embodied as one or more non-transient computer-readable storage media, such as one or more magnetic disks, magnetic tapes, compact disks, DVDs, optical disks, flash memories, Application Specific Integrated Circuits (ASICs), Field Programmable Gate Arrays (FPGAs), and the like (shown by way of example as media 350 and 450 of FIGS. 3 and 4). The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of formatting file system metadata, comprising:
   receiving, from a requestor, a request to read file system metadata from a designated location of a storage volume;
   reading the designated location of the storage volume;
   testing whether data read from the designated location of the storage volume matches a predetermined pattern indicating an unformatted state; and
   generating formatted metadata for the designated location of the storage volume when the data read from the designated location matches the predetermined pattern,
   wherein, generating the formatted metadata includes producing the formatted metadata in memory, and wherein the method further comprises:
   returning the generated metadata to the requestor;
   receiving another request from the requestor to write a modified version of the generated metadata to the designated location of the storage volume;
   queuing the writing of the formatted metadata to the storage volume; and
   updating a transaction log with an entry that indicates an intent to write the formatted metadata to the storage volume.

2. The method of claim 1, further comprising, prior to receiving the request for file system metadata:
   receiving an instruction from a client application for reading or writing to the designated location of the storage volume; and generating the request for file system metadata at the designated location of the storage volume in response to receiving the instruction from the client application.

3. The method of claim 2, further comprising, after generating the formatted metadata, responding to the instruction for reading or writing to the designated location of the storage volume.

4. The method of claim 1, further comprising returning the data read from the designated location to the requestor as the requested file system metadata when the data read from the designated location does not match the predetermined pattern.

5. The method of claim 1, further comprising, when the data read from the designated location matches the predetermined pattern:
reading data from a second location of the storage volume to check for corruption; and
confirming that the data read from the designated location is not corrupted when the data read from the second location also matches the predetermined pattern indicating the unformatted state.

6. The method of claim 5, further comprising generating formatted metadata for the second location contemporaneously with generating the formatted metadata for the designated location.

7. The method of claim 6, further comprising maintaining synchronization between the data at the designated location and the data at the second location so that both are formatted together and both are unformatted together.

8. The method of claim 7, wherein the storage volume includes multiple slices, wherein each slice is subdivided into multiple cylinder groups, wherein the designated location is within one of the cylinder groups of one of the slices, and wherein the second location is within another of the cylinder groups of the same slice.

9. The method of claim 8, wherein the designated location and the second location are separated by half the size of the slice on which the designated location and the second location are situated.

10. The method of claim 1, further comprising, responsive to an error occurring prior to writing or when writing the formatted metadata to the storage volume:
accessing the transaction log to retrieve the entry that indicates the intent to write the formatted metadata to the storage volume; and
replaying activity specified in the entry of the transaction log to write the formatted metadata to the storage volume.

11. A storage array, comprising:
a set of processing units;
memory, coupled to the set of processing units, the memory constructed and arranged to store instructions executable by the set of processing units; and
a storage volume,
wherein the set of processing units executing instructions from the memory forms a specialized circuit constructed and arranged to:
receive, from a requestor, a request to read file system metadata from a designated location of the storage volume;
read the designated location of the storage volume;
test whether data read from the designated location of the storage volume matches a predetermined pattern indicating an unformatted state;
generate formatted metadata for the designated location of the storage volume when the data read from the designated location matches the predetermined pattern;
read data from a second location of the storage volume to check for corruption; and
confirm that the data read from the designated location is not corrupted when the data read from the second location also matches the predetermined pattern indicating the unformatted state.

12. The storage array of claim 11, wherein the predetermined pattern indicating the unformatted state is a pattern of all zeros.

13. The storage array of claim 11, wherein the specialized circuit is further constructed and arranged to maintain synchronization between the data at the designated location and the data at the second location so that both are formatted together and both are unformatted together.

14. The storage array of claim 11, wherein the storage volume includes multiple slices, wherein each slice is subdivided into multiple cylinder groups, wherein the designated location is within one of the cylinder groups of one of the slices, and wherein the second location is within another of the cylinder groups of the same slice.

15. A non-transitory computer readable medium including instructions which, when executed by a set of processors of a storage array, cause the set of processors to perform a method for of formatting file system metadata, the method comprising:
receiving, from a requestor, a request to read file system metadata from a designated location of a storage volume;
reading the designated location of the storage volume;
testing whether data read from the designated location of the storage volume matches a predetermined pattern indicating an unformatted state;
generating formatted metadata for the designated location of the storage volume when the data read from the designated location matches the predetermined pattern;
reading data from a second location of the storage volume to check for corruption; and
confirming that the data read from the designated location is not corrupted when the data read from the second location also matches the predetermined pattern indicating the unformatted state.

16. The non-transitory computer readable medium of claim 15, wherein generating the formatted metadata includes producing the formatted metadata in memory, and wherein the method further comprises:
returning the generated metadata to the requestor;
receiving another request from the requestor to write a modified version of the generated metadata to the designated location of the storage volume;
queuing the writing of the formatted metadata to the storage volume; and
updating a transaction log with an entry that indicates an intent to write the formatted metadata to the storage volume.

17. The non-transitory computer readable medium of claim 16, further comprising, responsive to an error occurring prior to writing the formatted metadata to the storage volume:
accessing the transaction log to retrieve the entry that indicates the intent to write the formatted metadata to the storage volume; and replaying activity specified in the entry of the transaction log to write the formatted metadata to the storage volume.

* * * * *